United States Patent [19]

Okamoto et al.

[11] Patent Number: 4,898,533
[45] Date of Patent: Feb. 6, 1990

[54] FLUIDIZED-BED ACTIVATION FURNACE FOR ACTIVATED CARBON

[75] Inventors: Tsuneo Okamoto; Yasuo Sakaguchi, both of Iwaki, Japan

[73] Assignee: Kureha Kagaku Kogyo Kabushiki Kaisha, Tokyo, Japan

[21] Appl. No.: 274,168

[22] Filed: Nov. 21, 1988

[30] Foreign Application Priority Data

Nov. 25, 1987 [JP] Japan .................... 62-296660

[51] Int. Cl.[4] ............................ F27B 15/00
[52] U.S. Cl. ...................... 432/58; 432/15; 110/245; 34/57 A
[58] Field of Search .............. 432/58, 15; 110/245; 122/40; 34/57 A, 57 B, 57 C; 406/91

[56] References Cited

U.S. PATENT DOCUMENTS

| | | |
|---|---|---|
| 3,260,389 | 7/1966 | Paton . |
| 3,829,983 | 8/1974 | White .................................. 432/58 |
| 4,002,263 | 1/1977 | Marcellini . |
| 4,039,290 | 8/1977 | Inada et al. ......................... 432/58 |
| 4,062,656 | 12/1977 | Blaser et al. ...................... 110/245 |
| 4,148,752 | 4/1979 | Bürger et al. ...................... 432/15 |

FOREIGN PATENT DOCUMENTS

| | | | |
|---|---|---|---|
| 57-150720 | 9/1982 | Japan ................................. | 110/245 |
| 207033 | 2/1977 | Switzerland . | |
| 1278538A | 12/1986 | U.S.S.R. ........................... | 110/245 |

OTHER PUBLICATIONS

Kagaku Sochi (Plant & Process), vol. 17, No. 5, pp. 38-44, (May 1975).

Primary Examiner—Henry A. Bennet
Assistant Examiner—Christopher B. Kilner
Attorney, Agent, or Firm—Nixon & Vanderhye

[57] ABSTRACT

A fluidized-bed activation furnace for activated carbon is disclosed. The furnace is provided with a central hollow pillar having an outlet for discharging activated carbon granules at the upper portion thereof, a bowl-shaped cap covering the top portion of the central hollow pillar and a perforated plate fixed to the outer periphery of the central hollow pillar below the outlet for discharging activated carbon granules. After the granules of carbon are activated while a fluidized-bed is formed of the activated carbon granules, the substantially whole amount of granular activated carbon is discharged in a short time maintaining a high temperature.

3 Claims, 2 Drawing Sheets

FLUIDIZED-BED ACTIVATION FURNACE FOR ACTIVATED CARBON

BACKGROUND OF THE INVENTION

The present invention relates to a fluidized-bed activation furnace for activated carbon. In the conventional process for activating carbon, a rotary kiln, a moving-bed reaction apparatus, a fluidized-bed reaction apparatus, etc. are used. Among these, the fluidized-bed reaction apparatus is excellent in that the heat exchange rate is so high as to make the temperature of the whole carbon granules uniform, thereby producing a uniform product in quality especially in batch-wise operation.

In any type of the apparatus, however, the reaction temperature is so high as 800° to 1000° C. that contact reaction of the carbon granules with a large amount of steam is necessary. It is also necessary to cool the product by some method in order to discharge it from the reaction apparatus. In the rotary kiln and the moving-bed reaction apparatus, the activation reaction and cooling are ordinarily continuous. On the other hand, the fluidized-bed reaction apparatus can be used both as a continuous apparatus and as a batch-wise apparatus. In the case of a batch-wise apparatus, the residence time is uniform and it is possible both to obtain a product having a uniform reaction rate and to obtain various products of different qualities by varying the reaction rate for each batch. However, unlike a continuous apparatus, since a batch-wise apparatus must raise and lower the temperature of the activation furnace itself at every activation, there is much loss of time and energy. In addition, repeating Temperature-rising and-falling of apparatus is apt to produce a problem of deterioration of the apparatus. Since a part of a lift valve for discharging the granules of product from the bottom portion of a conventional reactive layer is exposed to a high temperature fluidized-bed and the structure requires the valve to be installed at a height of at least several ten mm above the perforated plate, the product granules which are below the valve in the activation furnace are difficult to be discharged (see FIG. 4). These granules remain in the next batch and will be activated twice. It will cause nonuniform product.

As a result of researches undertaken by some of the present inventors so as to solve these problems, a fluidized-bed activation furnace was developed which comprises a central hollow pillar vertically extending from the bottom portion of the fluidized-bed activation furnace to the central portion of the furnace, a bowl-shaped cap covering the top portion of the central hollow pillar, a perforated plate located under the bowl-shaped cap and fixed to the outer periphery of the central hollow pillar below an outlet for discharging activated carbon granules so as to divide the activation furnace into two portions of a upper portion and a lower portion, a steam jacket and a fire resistant and heat insulating material covering the outer periphery of the central hollow pillar, a cooling steam introducing system, and a high temperature activating gas introducing system which is provided at the lower portion of the furnace (refer to "Kagaku Sôchi", the May number (1975), pp. 38 to 44).

The present inventors further studied on this fluidized-bed activation furnace and, as a result, it has been found that it is possible to discharge substantially the whole amount of activated carbon granules in a short time maintaining the high temperature without leaving almost any activated carbon granules on the perforated plate by controlling (i) the opening ratio of the perforated plate and (ii) the angle of inclination of the perforated plate respectively in a specified range, thereby shortening the cycle time per batch. The present invention has been achieved on the basis of this finding.

Accordingly, it is an object of the present invention to eliminate the above-described problems in the prior art and to provide a fluidized-bed activation furnace for carbon in which substantially the whole amount of activated carbon granules can be discharged in a short time maintaining the high temperature after the activation of granules of active carbon forming a fluidized-bed of the activated carbon granules.

SUMMARY OF THE INVENTION

In an aspect of the present invention, there is provided a fluidized-bed activation furnace comprising:
  a central hollow pillar vertically extending from the bottom portion of the fluidized-bed activation furnace to the central portion of the furnace and having an outlet for discharging activated carbon granules at the upper portion thereof;
  a bowl-shaped cap covering the top portion of the central hollow pillar;
  a perforated plate located under the bowl-shaped cap and fixed to the outer periphery of the central hollow pillar below the outlet for discharging activated carbon granules so as to divide the fluidized-bed activation furnace into two portions of a upper portion and a lower portion;
  a steam jacket covering the outer periphery of the central hollow pillar and a fire resistant and heat insulating material covering the outer periphery of the steam jacket;
  a cooling steam introducing system for introducing cooling steam into the steam jacket; and
  a high temperature activating gas introducing system which is provided at the lower portion of the furnace; and wherein
  (a) the bowl-shaped cap has an inner diameter 1.2 to 3.0 times as large as the outer diameter of the central hollow pillar;
  (b) a gap between the lower edge of the bowl-shaped cap and the perforated plate is 5 to 50 mm;
  (c) the perforated plate is so designed that the opening ratio of an annular zone of the perforated plate between (i) the central hollow pillar and (ii) the outer periphery of a circle which is concentric with a circular cross section of the central hollow pillar and has a diameter 1.2 to 1.5 times as large as the inner diameter of the bowl-shaped cap is 1.2 to 3 times as large as the opening ratio of the zone of the perforated plate which is outside of the annular zone; and
  (d) the perforated plate is fixed to the outer periphery of the central hollow pillar in such a manner as to have a downward inclination of 2° to 10° toward the fixed portion of the perforated plate.

DETAILED DESCRIPTION OF THE INVENTION

The present invention relates to a fluidized-bed activation furnace for granular activated carbon. A fluidized-bed activation furnace according to the present invention is used for producing granular activated carbon by (1) calcinating and activating new un-activated granular carbon or (2) re-calcinating and re-activating used granular active carbon.

The fluidized-bed activation furnace according to the present invention comprises:

a central hollow pillar vertically extending from the bottom portion of the fluidized-bed activation furnace to the central portion of the furnace and having an outlet for discharging activated carbon granules at the upper portion thereof;

a bowl-shaped cap covering the top portion of the central hollow pillar;

a perforated plate located under the bowl-shaped cap and fixed to the outer periphery of the central hollow pillar below the outlet for discharging activated carbon granules so as to divide the fluidized-bed activation furnace into two portions of a upper portion and a lower portion;

a steam jacket covering the outer periphery of the central hollow pillar and a fire resistant and heat insulating material covering the outer periphery of the steam jacket;

a cooling steam introducing system for introducing cooling steam into the steam jacket; and a high temperature activating gas introducing system which is provided at the lower portion of the furnace; and wherein (a) the bowl-shaped cap has an inner diameter 1.2 to 3.0 times as large as the outer diameter of the central hollow pillar;

(b) a gap between the lower edge of the bowl-shaped cap and the perforated plate is 5 to 50 mm;

(c) the perforated plate is so designed that the opening ratio of an annular zone of the perforated plate between (i) the central hollow pillar and (ii) the outer periphery of a circle which is concentric with a circular cross section of the central hollow pillar and has a diameter 1.2 to 1.5 times as large as the inner diameter of the bowl-shaped cap is 1.2 to 3 times as large as the opening ratio of the zone of the perforated plate which is outside of the annular zone; and (d) the perforated plate is fixed to the outer periphery of the central hollow pillar in such a manner as to have a downward inclination of 2° to 10° toward the fixed portion of the perforated plate.

The attached drawings will now be explained in detail.

Figure 1:
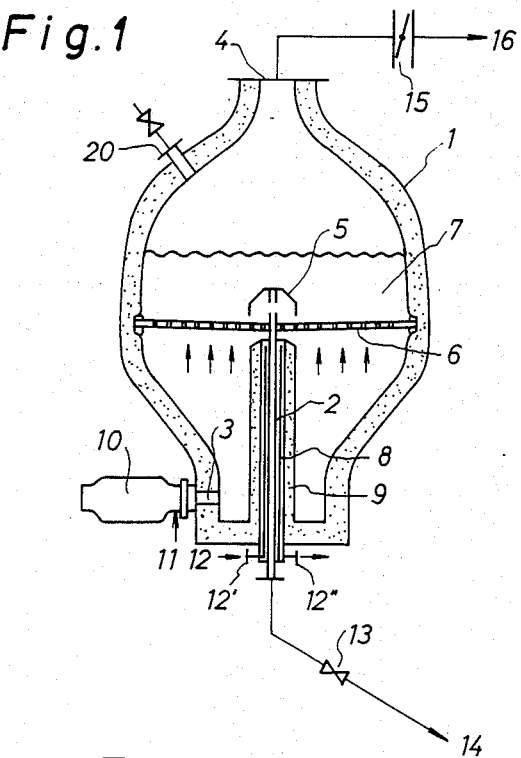
FIG. 1 is a schematic view of a fluidized-bed activation furnace according to the present invention.
Figure 2:
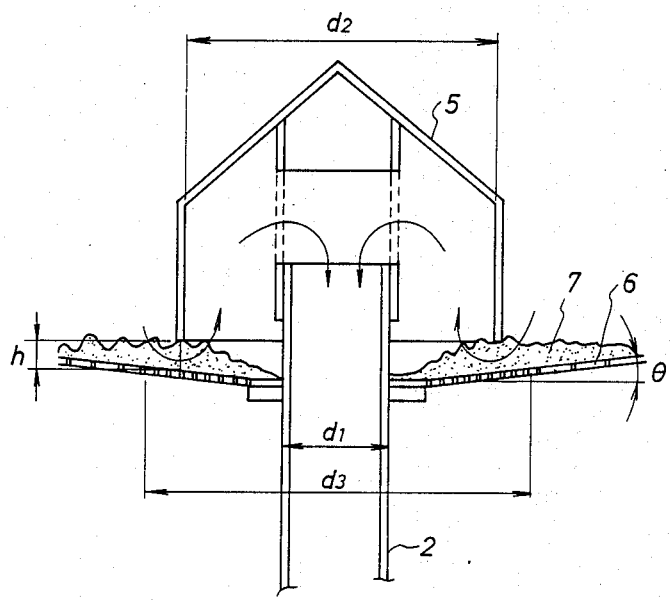
FIG. 2 shows an engaged state of a central hollow pillar, a bowl-shaped cap and a perforated plate of the fluidized-bed activation furnace according to the present invention.
Figure 3:
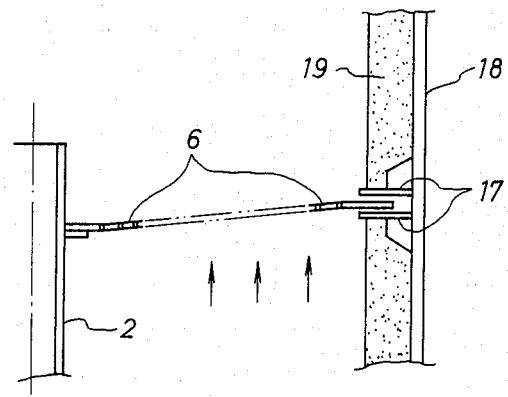
FIG. 3 shows an engaged state of the perforated plate and an inner wall of the fluidized-bed activation furnace according to the present invention.

In FIGS. 1 to 3, the reference numeral 1 represents a fluidized-bed activation furnace, 2 a central hollow pillar, 5 a bowl-shaped cap, 6 a perforated plate, 7 a fluidized-bed, 8 a steam jacket, 9 a fire resistant and heat insulatihg material, 10 a combustion furnace, 11 an activating steam inlet, 12' a cooling steam inlet, 15 a discharged gas damper, and 20 a granule inlet.

In FIG. 3, the reference numeral 17 denotes a support, 18 a shell and 19 a fire resistant and heat insulating material.

Figure 4:
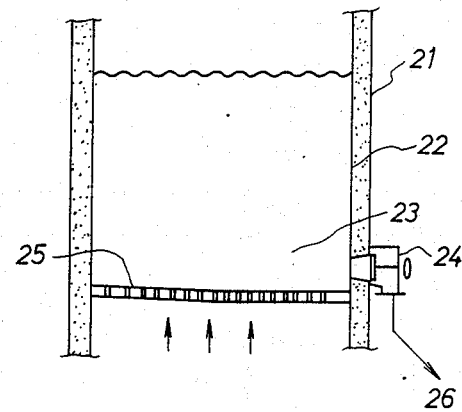
FIG. 4 shows a fluidized-bed and an outlet for discharging activated carbon granules of a conventional fluidized-bed activation furnace.

In FIG. 4, the reference numeral 21 represents a fluidized-bed activation furnace, 23 a fluidized-bed, 24 a discharging valve, and 25 a perforated plate.

The perforated plate 6 in accordance with the present invention has a plurality of through holes for passing activating gas vertically therethrough. The "opening ratio" of the perforated plate in the present invention means the ratio (percentage) of the sum of the horizontal sectional areas of the plurality of holes in a designated zone of the perforated plate to the total area (including the horizontal sectional areas of the holes) of the designated zone of the perforated plate.

A fluidized-bed activation furnace according to the present invention has a fundamental structure such as that shown in FIG. 1.

A fluidized-bed activation furnace 1 is provided with a granule inlet 20 on the side wall at the upper portion of the furnace 1, a central hollow pillar 2 vertically extending from the bottom portion of the fluidized-bed activation furnace to the central portion of the furnace and having an outlet for discharging activated carbon granules, a high temperature activating gas inlet 3 at the lower portion of the furnace 1 and a fluidized gas outlet 4 at the top portion of the furnace 1. The top portion of the central hollow pillar 2 is covered with a bowl-shaped cap 5. A perforated plate 6 is fixed (i) to the outer periphery of the upper portion of the central hollow pillar 2 and (ii) below the outlet for discharging activated carbon granules located under the bowl-shaped cap so as to divide the fluidized-bed activation furnace into two portions of a upper portion and a lower portion. On the perforated plate 6, a fluidized-bed 7 is formed of activated carbon granules. The outer periphery of the central hollow pillar 2 is covered with a steam jacket 8, and the outer periphery of the steam jacket 8 is covered with a fire resistant and heat insulating material 9. The high temperature activating gas inlet 3 located at the lower portion of the furnace 1 is provided with a high temperature activating gas introducing system comprising a combustion furnace 10 and a steam inlet 11 so that the high temperature activating gas is introduced into the furnace 1 from the lower portion thereof. Cooling steam 12 is introduced from a cooling steam inlet 12' located at the bottom portion of the furnace 1 into the steam jacket 8 so as to cool the central hollow pillar 2. The activated carbon granules which have passed through the central hollow pillar 2 are introduced into a cooling fluidized-bed tank 14 (not shown in Figures) through a valve 13 which is disposed at a distance from the furnace 1. The activating gas introduced from the high temperature activating gas inlet 3 passes through the holes of the perforated plate 6 to fluidize and activate the granules of carbon, and is discharged from the outlet 4 located at the top portion of the furnace 1. The gas discharged from the furnace 1 is introduced into a heat recovering apparatus 16 (not shown in Figures) through a damper 15 provided on a pipe line connected to the outlet 4 for discharging the fluidized activating gas.

FIG. 2 shows the structure of the upper portion of the central hollow pillar 2, the bowl-shaped cap 5 and the perforated plate 6 of the fluidized-bed activation furnace 1 of the present invention. Owing to this structure, substantially the whole amount of granular activated carbon on the fluidized-bed can be discharged from the furnace 1 in a short time maintaining the high temperature without leaving any granules on the perforated plate 6.

The perforated plate 6 is fixed to the upper portion of the central hollow pillar 2 which is located at the center of the furnace 1 and has the outlet for discharging activated carbon granules at the upper portion thereof. The top portion of the central hollow pillar 2 is covered with the inverted bowl-shaped cap 5. The cap 5 and the valve 13 outside the furnace 1 cut off the gas flow during activation, thereby preventing flowing of the granules into the central hollow pillar 2. With the opening of the valve 13, the granules forming the fluidized-bed 7 flow into the central hollow pillar 2 together with the fluidized gas in the direction indicated by the arrows and are introduced to the outside of the furnace 1. The outlet for discharging activated carbon granules, namely, the upper edge of the central hollow pillar 2 is located at a height of 50 to 300 mm, preferably 100 to 200 mm above the upper surface of the perforated plate 6.

In order to discharge substantially the whole amount of granular activated carbon, it is necessary to gather the granules together in the vicinity of the outlet for discharging the granules and to fluidize them until the last moment of discharge.

For this purpose, the perforated plate 6 is downwardly inclined at $\theta=2°$ to $10°$, preferably $4°$ to $8°$ toward the fixed portion of the perforated plate 6 which is fixed to the outer periphery of the central hollow pillar 2. If $\theta$ is less than $2°$, it takes a long time to gather the granules together in the vicinity of the outlet located at the center of the perforated plate 6. On the other hand, if $\theta$ exceeds $10°$, the fluidity of the granules in the vicinity of the center of the upper surface of the perforated plate 6 is deteriorated. In order to improve the fluidity of the granules in the vicinity of the center of the upper surface of the perforated plate 6, the perforated plate 6 is so designed that the opening ratio of an annular zone of the perforated plate 6 between (i) the central hollow pillar 2 and (ii) the outer periphery of a circle which is concentric with a circular cross section of the central hollow pillar 2 and has 1.2 to 1.5 times a diameter $d_3$ as large as the inner diameter $d_2$ of the bowl-shaped cap 5 is 1.2 to 3 times, preferably 1.5 to 2.0 times as large as the opening ratio of the zone of the perforated plate 6 which is outside of the annular zone. The thus-designed perforated plate 6 is capable of fluidizing the granules, thereby gathering them toward the center even when the level of the fluidized-bed of the granules is lowered.

The opening ratio of the annular zone is generally 0.4 to 3.0%, preferably 0.6 to 2.0%, and the opening ratio of the zone outside of the annular zone is generally 0.3 to 1.5%, preferably 0.4 to 1.0%.

Each of the plurality of vertical through holes of the perforated plate 6 generally has a circular horizontal section. The diameter of the circle is ordinarily 1.0 to 3.0 mm, preferably 1.2 to 2.0 mm. The plurality of holes in the perforated plate 6 have a uniform diameter which will prevent activated carbon granules from dropping through the holes during the operation. Therefore, the opening ratios of the annular zone and the zone outside of the annular zone are controlled by the number of the holes provided in an appropriate arrangement in the perforated plate 6.

The inner diameter $d_2$ of the cap 5 is 1.2 to 3.0 times, preferably 1.5 to 2.0 times of the outer diameter $d_1$ of the central hollow pillar 2. If the inner diameter $d_2$ is smaller than 1.2 times of the outer diameter $d_1$ of the central hollow pillar 2, the area of the annular zone between $d_2$ and $d_1$ is so small that the amount of activated carbon granules which are picked up on the gas stream and blown into the central hollow pillar 2 inside the cap 5 is reduced, as shown in FIG. 2, and it takes a long time to discharge the granules. On the other hand, if $d_2$ is more than 3 times of $d_1$, the area of the annular zone formed by the difference between $d_2$ and $d_1$ is so large that the total amount of (i) gas which flows into the central hollow pillar 2 through the gap between the lower edge of the cap 5 and the perforated plate 6 and (ii) gas which passes through the perforated plate 6 covered with the cap 5 is insufficient for picking up the activated carbon granules on the gas stream and blowing them into the central hollow pillar 2 at an enough speed through the annular zone. In other words, the sectional area of the space through which the gas passes is so large in comparison with the amount of gas which transports the granules with the gas stream that the linear rising speed of the fluidized gas is reduced.

The gap between the lower edge of the cap 5 and the perforated plate 6 is also important. It is necessary to adjust the gap so as not to obstruct the flow of the granules and to maintain the appropriate gas flow rate. The gap is 5 to 50 mm, preferably 10 to 30 mm.

Since the activation reaction is carried out at a temperature of 800° to 1,000° C., it is necessary to protect the central hollow pillar 2 from exposure to the high temperature activating gas. There is a fear that the perforated plate 6 fixed to the central hollow pillar 2 moves due to the thermal deformation of the central hollow pillar 2, thereby producing a gap through which granules may pass, between the outer periphery of the plate and the inner wall of the furnace 1. To prevent this, the central hollow pillar 2 is covered with the steam jacket 8 having at least double steam jackets. Cooling steam is introduced from the cooling steam inlet 12' into the inner jacket and discharged from a nozzle 12". The fire resistant and heat insulating material 9 is wound around the outer periphery of the jacket 8 so as to prevent the jacket 8 from exposure to the high temperature activating gas. Since the valve 13 for cutting off gas is installed below the bottom of the furnace 1, namely, outside of the furnace 1, as shown in FIG. 1, the valve 13 is not exposed to a high temperature gas during activation. It is also easy to cool the valve 13 by providing the valve 13 with a cooling jacket when the granules of high temperature pass through the valve 13 on discharge of the granules. Thus, the reliability of the valve 13 is enhanced.

In order to improve the dimensional stability of the central hollow pillar 2, the perforated plate 6 is engaged with the inner wall of the furnace 1 by inserting the perforated plate 6 between upper and lower supports 17 in such a manner that the outer periphery of the perforated plate 6 is slidable substantially in the horizontal direction between the upper and lower supports 17, as shown in FIG. 3. The supports 17 are fixed to a shell 18 and are protected by a fire resistant and heat insulating material 19. This structure absorbs the heat expansion of the perforated plate 6 only at the outer periphery of the plate, thereby preventing the deformation of the central hollow pillar 2 and enhancing the dimensional stability.

The higher the differential pressure between the fluidized-bed 7 and the cooling fluidized-bed tank 14, the more the amount of activated carbon which can be transported to the cooling fluidized-bed tank 14. To increase the pressure in the fluidized-bed 7 during the transportation operation, the damper 15 which is installed at a pipe line connected to the outlet 4 can be slightly closed. By this procedure the rate of activated carbon transportation can be increased.

According to the fluidized-bed activation furnace of the present invention, it is possible to discharge substantially the whole amount of granular activated carbon in a short time maintaining the high temperature, thereby shortening the batch cycle time for activating granular carbon.

The present invention will be explained in more detail hereinunder with reference to the following non-limitative example.

EXAMPLE

Granular carbon was activated in the fluidized-bed activation furnace shown in FIG. 1. The pressure of the fluidized-bed 7 during activation was 50 mmH$_2$O by gauge pressure. When the activated carbon granules were transported into the cooling fluidized-bed tank 14 (not shown in Figures), the damper 15 was slightly closed to increase the inner pressure to 500 mmH$_2$O by gauge pressure. Thereafter, the valve 13 was opened. Steam had been blown into the cooling fluidized-bed tank 14 in advance as cooling gas. The inner pressure of the cooling fluidized-bed tank 14 was approximately the same as the atmospheric pressure. After about 2,500 kg of the activated carbon was discharged during about 30 minutes in this state, the supply of activating steam was stopped. The activated carbon remaining on the perforated plate 6(after the furnace 1 had been completely cooled)weighed 14.5 kg. This was equivalent to about 0.6% of the whole amount of activated carbon. Thus, substantially the whole amount of activated carbon was discharged.

The inner diameter of the central hollow pillar 2 was about 150 mm, the outer diameter being about 165 mm. The diameters of the pipe and the valve connected to the central hollow pillar 2 were nominally 6 inches. The inner diameter of the activation furnace 1 was about 3,450 mm. The opening ratio of the annular zone of the perforated plate 6 between (i) the central hollow pillar 2 and (ii) the outer periphery of a circle which is concentric with a circular cross section of the central hollow pillar 2 and has the diameter of 670 mm was 1.8%, the opening ratio of the zone of the perforated plate 6 which is outside of the annular zone being 0.9%. The diameter of each hole of the perforated plate 6 was 1.5 mm. The perforated plate was fixed to the central hollow pillar 2 and had a downward inclination of 4° from the outer periphery of the perforated plate toward the fixed portion of the plate. The inner diameter of the cap 5 was 450 mm, the gap (indicated by the symbol h in FIG. 2) between the lower edge of the cap 5 and the upper surface of the perforated plate 6 was 30 mm, and the distance between the outlet for discharging activated carbon granules, namely, the upper edge of the central hollow pillar 2 and the upper surface of the perforated plate 6 was 200 mm. The average of granule diameter of the granular activated carbon was 720$\mu$.

COMPARATIVE EXAMPLE 1

Granular carbon was activated in a fluidized-bed 23 of fluidized-bed activation furnace 21 having the inner diameter of 1,200 mm and provided with a discharging valve 24 on a side wall 22 in which the lower edge of the valve 24 is located at a height of 50 mm above a perforated plate 25, as shown in FIG. 4. After the completion of activation, the granular activated carbon was transported into a cooling fluidized-bed tank 26 (not shown in FIG. 4). The inner pressure of the furnace 21 was 150 mmH$_2$O by gauge pressure, and the inner pressure of the cooling fluidized-bed tank 26 was 30mmH$_2$O by gauge pressure under the condition that the steam for fluidizing the granules was introduced therein. The valve 24 was opened in this state, and after 30 minutes about 300 kg of activated carbon was discharged. The weight of the granules remaining on the perforated plate 25 after cooling was 16.9 kg, which was equivalent to 5.3% of the total amount of activated carbon. The weight ratio of remaining granules was about 9 times of that in Example.

The perforated plate 25 was horizontally provided and the diameter of each hole was 1.5 mm, the opening ratio being uniformly 1.5% through the plate.

The granules of the activated carbon had the average diameter of 690 $\mu$ which was substantially the same as that in Example.

COMPARATIVE EXAMPLE 2

Granular carbon was activated by using the same fluidized-bed activation furnace 1 shown in FIG. 1 as in Example except that the opening ratio of the perforated plate 6 was uniformly 0.9% through the plate. (A) the pressure during activation and (B-I) the pressure applied to the furnace 1 by slightly closing the discharged gas damper 15 and (B-II) the inner pressure of the cooling fluidized-bed tank 14 at the initiation of transporting the activated carbon into the cooling fluidized-bed tank 14 were respectively the same as those in Example. In this state, it took about 70 minutes to discharge about 2,500 kg of the activated carbon. The activated carbon granules remaining on the perforated plate 6 weighed about 57 kg. This was equivalent to about 2.3% of the total amount of activated carbon. The remaining ratio of granules was about 4 times of that in Example.

What is claimed is:

1. A fluidized-bed activation furnace comprising:
   a central hollow pillar vertically extending from a bottom portion of said fluidized-bed activation furnace to a central portion of said furnace and having an outlet for discharging activated carbon granules at an upper portion thereof;
   a bowl-shaped cap covering a top portion of said central hollow pillar;
   a perforated plate located under said bowl-shaped cap and fixed to an outer periphery of said central hollow pillar below said outlet for discharging activated carbon granules so as to divide said fluidized-bed activation furnace into two portions of an upper portion and a lower portion;
   a steam jacket covering the outer periphery of said central hollow pillar and a fire resistant and heat insulating material covering the outer periphery of said steam jacket;
   a cooling steam introducing system for introducing cooling steam, into said steam jacket; and
   a high temperature activating gas introducing system which is provided at the lower portion of said furnace; and wherein
   (a) said bowl-shaped cap has an inner diameter 1.2 to 3.0 times as large as an outer diameter of said central hollow pillar;

(b) a gap between a lower edge of said bowl-shaped cap and said perforated plate is 5 to 50 mm;
(c) said perforated plate is so designed that an opening ratio of an annular zone of said perforated plate between said central hollow pillar and an outer periphery of a circle which is concentric with a circular cross section of said central hollow pillar and has a diameter 1.2 to 1.5 times as large as the inner diameter of said bowl-shaped cap, is 1.2 to 3 times as large as an opening ratio of a zone of said perforated plate which is outside of said annular zone; and
(d) said perforated plate is fixed to the outer periphery of said central hollow pillar in such a manner as to have a downward inclination of 2° to 10° toward a fixed portion of said perforated plate.

2. A fluidized-bed activation furnace according to claim 1, wherein a damper is provided on a pipe line connected to an outlet for discharging an activating gas located at the top portion of said fluidized-bed activation furnace.

3. A fluidized-bed activation furnace according to claim 1, wherein an outer periphery of said perforated plate is engaged with the inner wall of said fluidized-bed activation furnace in such a manner as to be slidable substantially in the horizontal direction.

* * * * *